United States Patent [19]

Franchina et al.

[11] Patent Number: 4,711,565
[45] Date of Patent: Dec. 8, 1987

[54] ADD-ON ATTACHMENT FOR HIGH-SPEED PHOTOGRAPHIC PRINTER

[75] Inventors: Thomas F. Franchina, Johnson City, N.Y.; Gunnar G. Gudmundson, Longmeadow; John R. Reuss, Westfield, both of Mass.

[73] Assignee: 2610 PGA Partnership, San Francisco, Calif.

[21] Appl. No.: 15,500

[22] Filed: Feb. 6, 1987

Related U.S. Application Data

[63] Continuation of Ser. No. 843,802, Mar. 27, 1986, abandoned, which is a continuation of Ser. No. 478,612, Mar. 24, 1983, abandoned.

[51] Int. Cl.4 .............................................. G03B 27/32
[52] U.S. Cl. .................................................. 355/39
[58] Field of Search ............................ 355/39, 40, 43; 354/105, 106, 107, 108, 109, 295; 352/55, 90

[56] References Cited

U.S. PATENT DOCUMENTS

| | | | |
|---|---|---|---|
| 2,821,124 | 1/1958 | Enright | 355/40 |
| 3,111,887 | 11/1963 | Alexander | 354/105 |
| 3,424,527 | 1/1969 | Bremson, Jr. | 354/109 X |
| 4,185,913 | 1/1980 | Ammann et al. | 355/43 |

Primary Examiner—Michael L. Gellner
Assistant Examiner—Brian W. Brown
Attorney, Agent, or Firm—Lyon & Lyon

[57] ABSTRACT

An add-on attachment which can be mounted to an existing high speed photographic printer adjacent the primary image projection system for projecting secondary images onto a photosensitive strip adjacent primary images supplied to the strip by the primary projection system. The operation of the attachment is synchronized with the operation on the primary image projection system to provide a one-to-one correspondence between the primary and secondary images.

12 Claims, 3 Drawing Figures

FIG. I.

ADD-ON ATTACHMENT FOR HIGH-SPEED PHOTOGRAPHIC PRINTER

This is a continuation of co-pending application Ser. No. 843,802, filed on Mar. 27, 1986, now abandoned, which is a continuation of application Ser. No. 478,612, filed Mar. 24, 1983, now abandoned.

TECHNICAL FIELD

The present invention relates to high-speed photographic printers in general and more particularly concerns an attachment which may be conveniently mounted on a high-speed photoprinter adjacent the existing photoprinter primary image projection system for the purpose of synchronously projecting primary and secondary images onto predetermined areas of a photosensitive strip moving beneath the primary image projection system.

BACKGROUND ART

Use of apparatus to provide multiple images on photosensitive paper is widespread in the photoprinting art. For example, a photofinisher may employ two or more photographic negatives in a multiple projection system to superimpose images of two or more persons or objects at the same location on the photosensitive paper. The resulting "double-exposure" is designed to enhance the artistic and esthetic qualities of the individual negatives. Similarly, multiple projector systems are utilized in the microfiche industry to record multiple independent images of alphanumatic data onto microfilm, as illustrated in U.S. Pat. No. 4,185,913 issued to Ammann, et al. Other types of multiple imaging systems combine image projection techniques with contact printing techniques to obtain side-by-side exposures of projected pictorial images and contact-printed graphic displays or written messages on photosensitive paper. U.S. Pat. No. 3,424,527 issued to Bremson, Jr., discloses such a combination of image projection/contact printing systems capable of producing advertising or instructional materials or the like. The recently popularized photographic greeting cards also incorporate images generated by contact printing with images generated by projection. A typical photographic greeting card consists of a "family" portrait positioned on one portion of the card and an appropriate greeting or "sentiment" positioned on another portion of the card in spaced relationship to the "family" portrait. During photoprocessing of the greeting cards, a photosensitive strip moving through the photoprocessing machine is exposed to the family portrait using a conventional projection system to project the primary or portrait image from a portrait negative onto the photosensitive strip. The secondary image of the sentiment is reproduced on the photosensitive strip using a contact printer mechanism which applies the sentiment negative directly to the strip surface. This procedure is performed continuously along the entire length of the photosensitive strip and the strip is subsequently developed to yield a plurality of greeting cards which may be separated from one another and returned to individual customers.

With the advent of high-speed computerized photoprinters such as the Kodak 2610 photoprinter, photoprocessing capacities have increased dramatically. Up to one thousand photographic prints can now be exposed per hour. Attempts to coordinate the operation of high-speed photoprinters and prior art contact printing mechanisms during composition of multiple image photographic greeting cards, however, has met with limited success. As can be appreciated, the mechanical lag associated with prior art contact printers seriously restricts the number of multiple images which can be formed on a photosensitive strip in a given amount of time. The processing rate of high-speed photoprinters employed in conjunction with contact printers must therefore be slowed considerably if the contact printing operation is to keep pace with the projection printing operation in the high-speed photoprinter, and much of the high-speed photoprinter capacity is wasted. Under these circumstances, it would be of obvious benefit to provide an apparatus which could be added to existing high-speed photoprinters to provide a high-speed secondary image projection capability which matches the inherent high-speed primary image projection capability of the photoprinter.

DISCLOSURE OF THE INVENTION

It is accordingly an object of the present invention to provide an attachment which can be mounted adjacent to the primary image projection system in an existing high-speed photoprinter to project secondary images onto a photosensitive strip adjacent the primary images supplied to the strip by the primary projection system.

It is a further object of the present invention to provide an attachment for projecting secondary images onto a photosensitive strip moving past a primary image projection system in an existing high-speed photoprinter, wherein the operation of the attachment is synchronized with the operation of the primary image projection system such that one-to-one correspondence is maintained between the primary and secondary images at high photoprinting speeds.

It is yet a further object of the present invention to provide an attachment for projecting secondary images onto a photosensitive strip moving past a primary image projection system in a high-speed photoprinter, wherein a masking means is provided to prevent light associated with the secondary image from reaching the area of the photosensitive strip reserved for the primary image.

These and other objects of the present invention are achieved with an attachment comprising a light-tight enclosure for supporting a translucent negative carrier on which a negative of the desired secondary image is mounted, a light source positioned in the enclosure for projecting the secondary image through an adjustable lens at one end of the enclosure and a mirror for reflecting the secondary image from the adjustable lens element to a desired location in a plane beneath the mirror. A shutter element disposed intermediate the negative carrier and the adjustable lens periodically opens to permit passage of the secondary image through the lens element to the mirror. The attachment is mounted on the side of a high-speed photoprinter dark cabinet in a position adjacent the existing primary image projection system of the photoprinter, thereby enabling projection of the secondary image from the attachment onto the photosensitive strip moving through the photoprinter. An adjustable mask element is placed over the photosensitive strip to prevent light leaving the adjustable lens element of the attachment from impinging upon the area of the photosensitive strip reserved for the primary image. The operation of the shutter mechanism in the attachment is coordinated with the operation of any one of several existing photoprinter mechanisms which are activated during the primary image projection process.

For example, the operation of the shutter mechanism can be tied to the operation of a photoprinter punch which is actuated as each primary image is projected to mark the location of that primary image on the photosensitive strip. A one-to-one correspondence between each primary image and each secondary image is thus guaranteed. When the attachment is not in use, it can be removed from the photoprinter darkcabinet and the dark-cabinet opening can be covered to maintain the opaque integrity of the cabinet.

BRIEF DESCRIPTION OF THE DRAWINGS

The various features, objects and advantages of the present invention can be better understood upon consideration of the following Brief Description of the Drawings and Best Mode for Carrying Out the Invention, wherein.

BEST MODE FOR CARRYING OUT THE INVENTION

Figure 1:
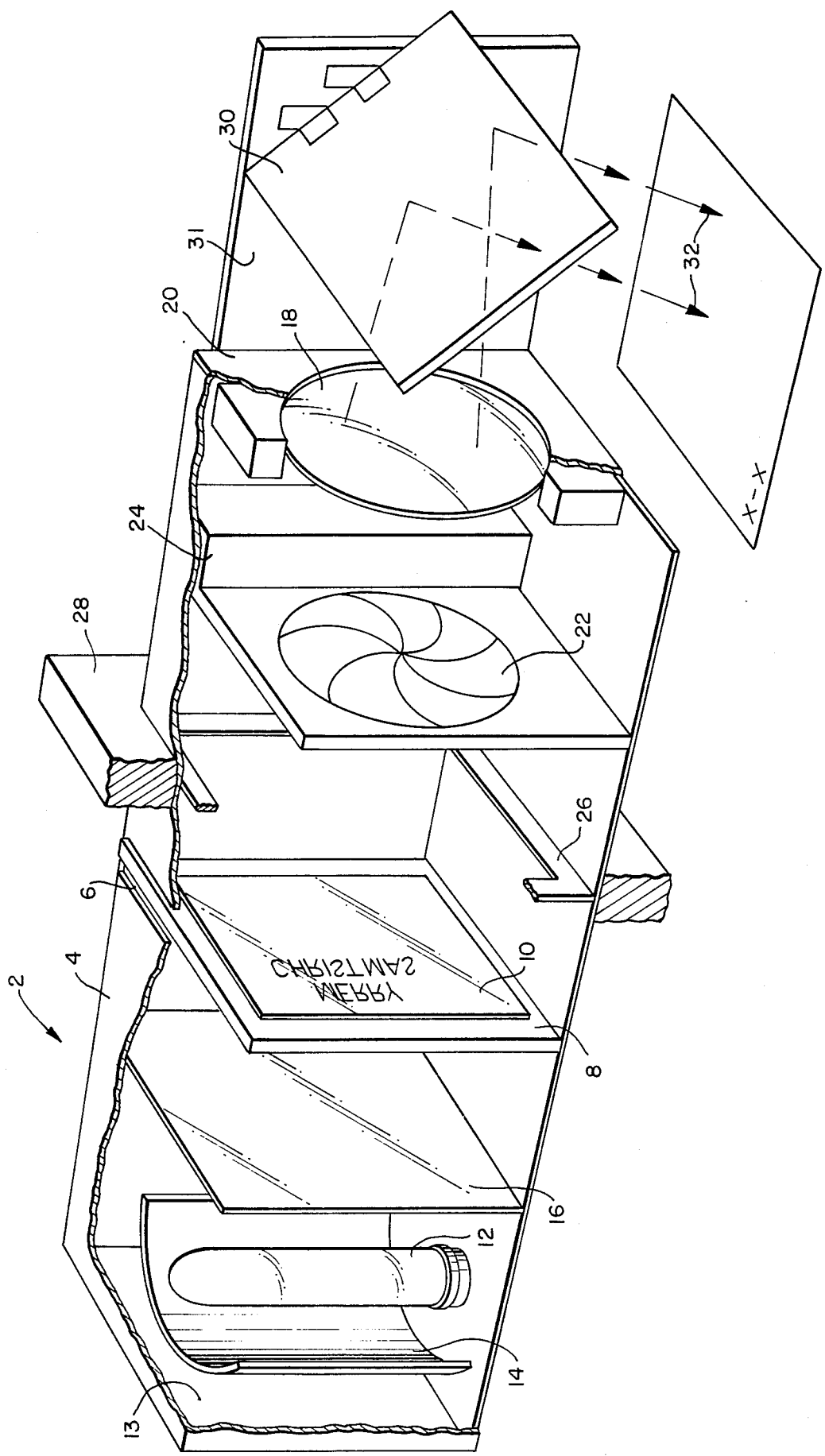
FIG. 1 is a perspective view of the secondary image projecting attachment of the present invention.

The add-on attachment of the present invention provides an existing high-speed, computerized photoprinter unit with multiple imaging, i.e., primary and secondary imaging, capability. The configuration of the attachment is consequently designed to facilitate mounting thereof on the photoprinter unit with minimum modification to the existing photoprinter structure. As illustrated in FIG. 1, the attachment 2 includes a lighttight enclosure 4 having a slot 6 disposed therein to receive a negative carrier 8. Negative carrier 8 specifically serves to support the secondary image or "sentiment" negative 10, and to this end comprises a white translucent structure on which the sentiment negative is mounted. When a change of sentiments is desired, negative carrier 8 may be removed from enclosure 4 through the slot 6. A replacement negative carrier supporting a new sentiment negative is then inserted back into the enclosure to complete the sentiment change.

Figure 2:
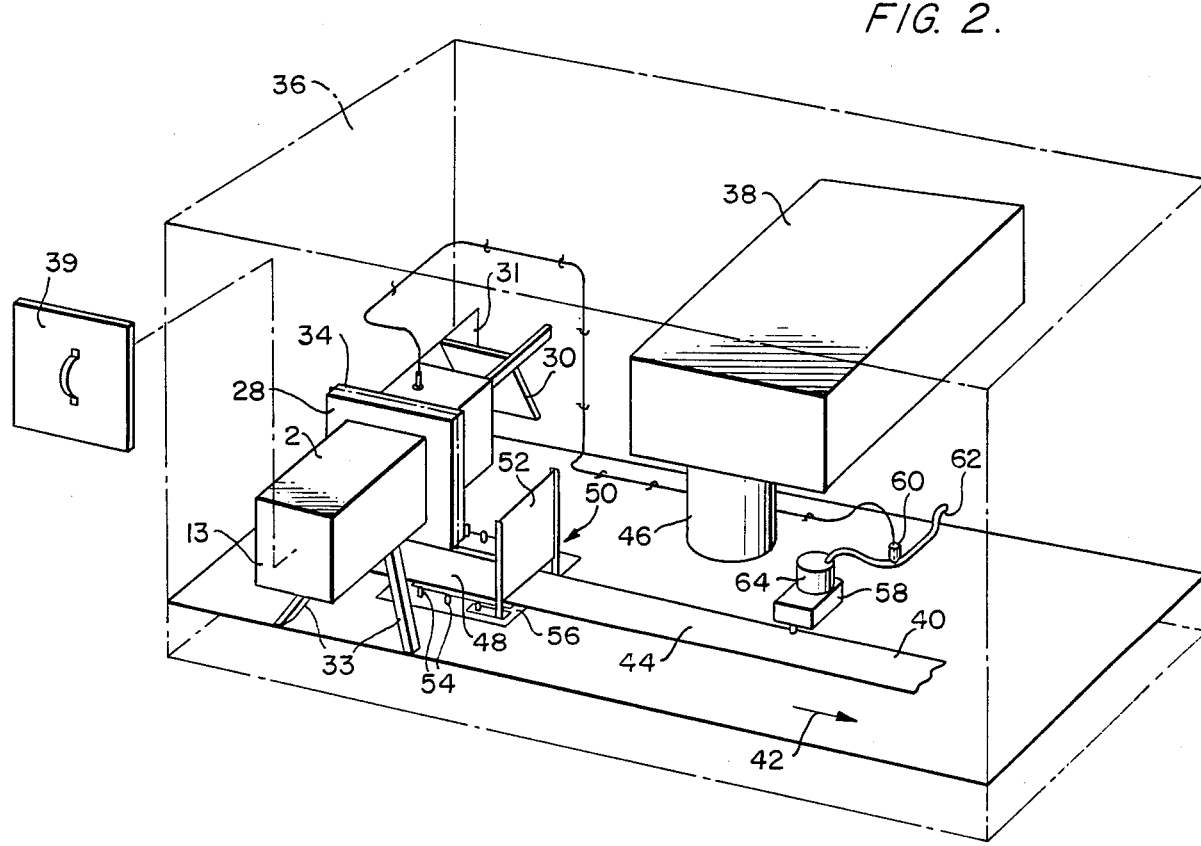
FIG. 2 illustrates the placement of the FIG. 1 attachment in a high-speed photoprinter.

Illumination for the sentiment negative 10 is provided by a lamp 12 such as a quartz-halogen lamp positioned near the rear wall 13 of enclosure 4. A reflector 14 such as a parabolic reflector fastened to the enclosure behind lamp 12 directs light from the lamp through the negative carrier 8 to the sentiment negative 10. A diffusing screen 16 may be placed between lamp 12 and negative carrier 8 to spread the light from lamp 12 uniformly over the surface of the sentiment negative 10 exposed to the lamp through the negative carrier. The image of the sentiment thus formed is projected from the negative carrier toward an adjustable lens element 18 mounted at the front wall 20 of enclosure 4. A leaf shutter 22 or the like covering lens element 18 is periodically opened by a shutter actuating mechanism 24 to permit passage of the sentiment image through the lens element to the exterior of the enclosure. As will be described in greater detail hereinbelow, actuating mechanism 24 utilizes an electrical circuit (not shown in FIG. 1) to synchronize the opening of leaf shutter 22 with the projection of the primary image inside the photoprinter unit (not shown in FIG. 2), ensuring that a one-to-one correspondence is established between each secondary or sentiment image exposure performed by the attachment and each primary image exposure performed by the photoprinter. An anti-glare mask 26 is disposed about the interior periphery of enclosure 4 at a location in advance of leaf shutter 22 to cut down on the amount of light which might otherwise be reflected off the interior surfaces of the enclosure and into lens element 18. A mounting plate 28, the exact details of which will be apparent to those skilled in the art, can be disposed about the outer periphery of the enclosure to assist in mounting attachment 2 to the photoprinter unit.

At each opening of shutter 22 in enclosure 4, lens element 18 directs the image of the sentiment onto a mirror 30 secured to a bracket 31 projecting from the enclosure. Mirror 30 thereafter reflects the sentiment image in the direction indicated by arrows 32. The position of adjustable lens element 18 may be shifted by any suitable means to focus the sentiment image in a plane X—X below attachment 2. When attachment 2 is mounted on an existing photoprinter, as described in connection with FIG. 2, the photosensitive strip (not shown in FIG. 1) traveling through the photoprinter will move along plane X—X to receive the sentiment image at periodic intervals defined by the shutter actuating rate. Preferably, attachment 2 is constructed such that mirror 30 will be positioned above and at a 45° incline relative to the photosensitive strip during secondary image projecting operations, although other spatial and angular orientations between the mirror and the photosensitive strip could be utilized as well.

The attachment of the present invention is designed for use with a high-speed, computerized photoprinter unit such as a Kodak 2610 photoprinter. As seen to best advantage in FIG. 2, attachment 2 is mounted via brackets 33 through a hole 34 cut in the dark cabinet 36 of the photoprinter adjacent the existing photoprinter primary image projection system 38. The dimensions of mounting plate 28 coincide with the dimensions of hole 34, thereby maintaining the opaque integrity of the dark cabinet. A portable plate 39 may be used to cover hole 34 after this attachment is removed from the photoprinter. When photoprinting operations are in progress, a photosensitive strip 40 advances through dark cabinet 36 in the direction of arrow 42 and is exposed to a primary or portrait image projected onto area 44 of the strip from lens 46 in primary image projection system 38. Simultaneously, the shutter actuating mechanism 24 (not shown in FIG. 2) in attachment 2 actuates leaf shutter 22, exposing area 48 of the photosensitive strip to the secondary image reflected via mirror 30 from the negative 10 mounted in the attachment. The photosensitive strip is then advanced further in the direction of arrow 42 until a new pair of unexposed areas 44 and 48 are respectively positioned beneath lens 46 and mirror 30, whereupon the primary and secondary images are again exposed. This procedure is repeated for the entire length of the photosensitive strip, after which the strip is developed to yield a series of photographic greeting cards. The amount of advance in the strip following each set of exposures can be controlled by programming appropriate dimensions into the photoprinter to achieve optimum spacing between each primary and secondary image. If desired, the primary image can be changed from time to time in accordance with the primary image projection sequence programmed into the photoprinter.

A mask element 50 including an opaque screen 52 releasably secured to guide pins 54 extending from a support plate 56 may be inserted between primary image projection system 38 and attachment 2 such that photosensitive strip 40 travels over the support plate and under the screen. Mask element 50 functions to prevent any light associated with the projection of the secondary image onto strip area 48 from reaching the primary image strip area 44, thus providing a clear delineation between the primary and secondary images on the photosensitive strip. Guide pins 54 are arranged to permit relocation of screen 52 depending upon the size (e.g., 110 mm, 126 mm or 135 mm) of the primary image projection system 38.

The operation of shutter actuating mechanism 24 (not shown in FIG. 2) in attachment 2 is synchronized with the operation of the primary image projection system 38 in the photoprinter, whereby one exposure of the secondary or sentiment negative 10 (not shown in FIG. 2) occurs for each exposure of a primary or portrait negative. More particularly, the shutter actuating mechanism is triggered by an existing mechanism in the photoprinter which is itself actuated each time the primary image projection system operates to project a primary image onto the photosensitive strip. For instance, as will be appreciated by those skilled in the art, the shutter acutating mechanism in attachment 2 can be tied to the shutter actuating mechanism (not shown) of the primary image projection system. Alternately, the shutter actuating mechanism in the attachment can be tied to the strip advancing mechanism (not shown) of the photoprinter. In a preferred embodiment of the present invention, shutter actuating mechanism 24 is actually connected to a punch marker 58 used by the photoprinter to mark the location of each primary image on the photosensitive strip. The location mark later serves as a guide for separating individual photogreeting cards exposed on the strip. Punch marker 58, which may be mechanically, electrically or pneumatically energized, is driven at intervals coinciding with each projection of a primary image from primary image projection system 38. If a pneumatic punch marker is present in the photoprinter, a microswitch 60 is placed in the air line 62 furnishing compressed air to the punch marker actuating mechanism 64. When air line 62 is pressurized to initiate marking of the photosensitive strip 40, microswitch 60 generates an electric signal which is used by shutter actuating mechanism 24 to actuate leaf shutter 22 in attachment 2. In this manner, the speed at which the secondary images are formed on the photosensitive strip can be coordinated with the speed at which the primary images are formed on the strip to provide one-to-one correspondence between each primary image and each secondary image.

Figure 3:
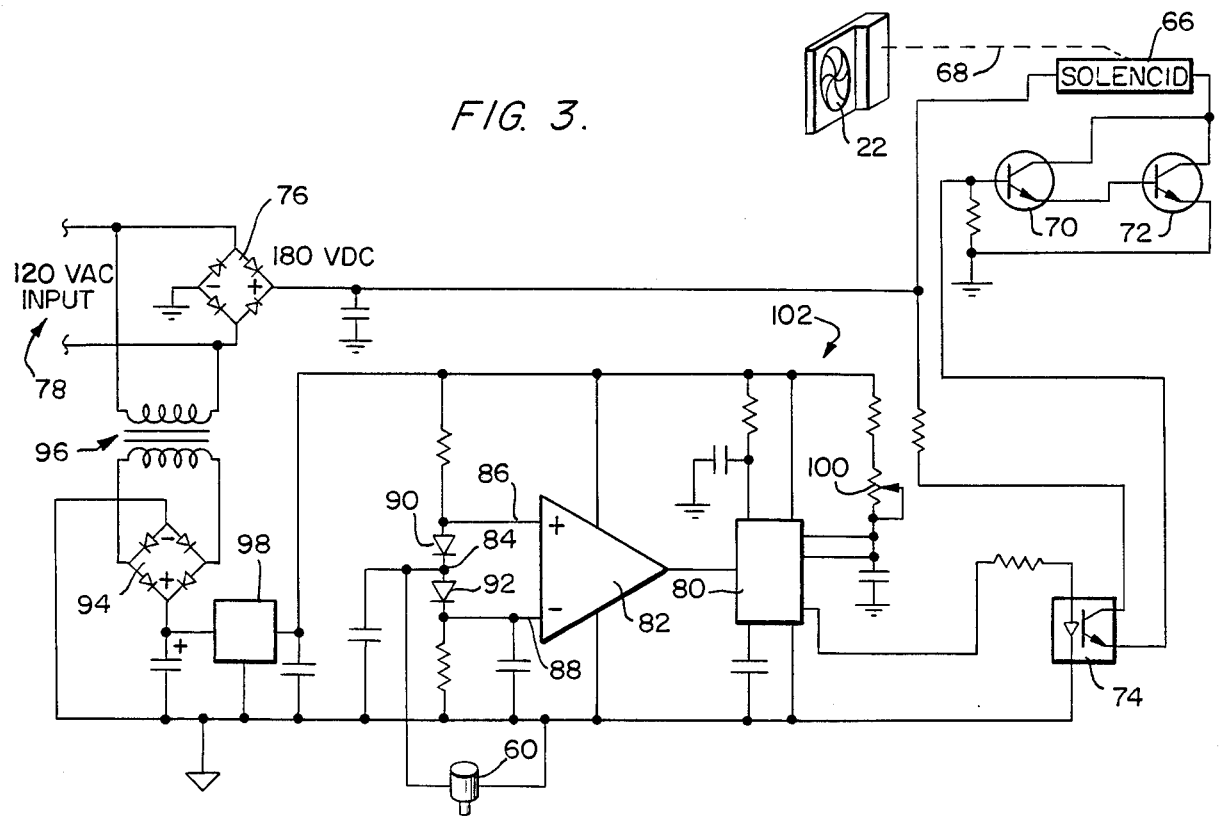
FIG. 3 is a circuit diagram of the control circuit used to synchronize secondary image projection from the attachment of the present invention with the primary image projection from the primary projection system of the high-speed photoprinter.

FIG. 3 is a diagram of the circuit employed by shutter actuating mechanism 24 to synchronize the operation of leaf shutter 22 with the operation of punch marker 58. The shutter actuating mechanism includes a shutter solenoid 66. When energized, shutter solenoid 66 acts through a conventional linkage structure 68 to open the individual leafs of leaf shutter 22. Power for the shutter solenoid is derived from a pair of high-voltage transistors 70, 72 arranged in cascade configuration. Transistors 70 and 72 are driven by the output of an opto-isolator 74 which receives voltage from a full-wave diode rectifier 76 connected across a 120 volt AC line input 78. Opto-isolator 76 is gated by the output of a one-shot retriggerable multivibrator 80. Multivibrator 80 is in turn driven by the output of an operational amplifier 82 having input circuitry tied to microswitch 60. Specifically, microswitch 60 is connected between ground and a voltage node 84 intermediate the positive input 86 and the negative input 88 of the operational amplifier. A pair of diodes 90 and 92 respectively connected between the positive and negative inputs 86, 88 and voltage node 84 establish a voltage drop across the operational amplifier depending upon the condition of the microswitch, using the output of a full-wave diode rectifier 94 connected through isolation transformer 96 to the 120 volt AC line input 78. A voltage regulator 98 regulates the output of diode rectifier 94 to a desired level.

When no pressure is present in the air line 62, microswitch 60 is open and voltage node 84 floats. The voltage at the positive input 86 to operational amplifier 82 then rises in response to the output of diode rectifier 94. The action of diodes 90 and 92 causes the voltage level at negative input 88 to drop below that of positive input 86, forcing the output of operational amplifier 82 high. The output of multivibrator 80 is then driven low to gate opto-isolator 76 off and prevent shutter solenoid 66 from energizing. If, however, air line 62 is pressurized in anticipation of the photosensitive strip marking operation, microswitch 60 closes to complete a current path from ground to voltage node 84 in the input circuitry of operational amplifier 82. The positive input 86 to the operational amplifier is thereafter pulled below the voltage level of the operational amplifier negative input 88 to produce a falling edge in the operational amplifier output. Multivibrator 80 next outputs a high pulse signal which gates opto-isolator 76 on to initiate conduction of high voltage transistors 70 and 72, at which point shutter solenoid 66 is energized to open leaf shutter 22 and pass the sentiment image from the sentiment negative 10 through the lens element 18 in attachment 2 (not shown in FIG. 3) to the photosensitive strip 40 (not shown in FIG. 3). The length of the positive pulse output from multivibrator 80, and hence the exposure interval defined by the opening of leaf shutter 22, can be shifted to suit the particular exposure requirements of the photosensitive strip by adjusting the variable resistor 100 in the multivibrator feedback circuit 102.

The present invention has been set forth in the form of one preferred embodiment. It is nevertheless understood that modifications to the add-on attachment disclosed herein may be made by those skilled in the art without departing from the spirit and scope of the present invention. Moreover, such modifications and variations are considered to be within the purview of the appended claims.

What is claimed is:

1. Apparatus for use in conjunction with a high-speed photoprinter having a dark cabinet structure with an external opening in one surface thereof and a primary projection system disposed in the dark cabinet, the primary projection system periodically operating to project primary images onto a photosensitive medium disposed in the photoprinter, said apparatus comprising;

projection means for projecting secondary images onto the photosensitive medium in response to a control signal;

control means for supplying said projection means with said control signal, said control means including a circuit means which determines when each primary image is projected onto the photosensitive medium by the primary projection system and which generates said control signal in response to each projection of the primary image such that synchronization is achieved between the operation of said projection means and the operation of the primary projection system to establish a one-to-one correspondence between each primary image projected onto the photosensitive medium and each secondary image projected onto the photosensitive medium; and a support means for retaining said projection means in a predetermined orientation relative to the primary projection system in the photoprinter such that said secondary images projected from said projection means are positioned on the photosensitive medium in the photoprinter in fixed relationship to the primary images, said support means including a support structure having an add-on configuration adapted to releasably secure said projection means in the external opening of the photoprinter dark cabinet to provide access to said projection means from outside the dark cabinet.

2. Apparatus as set forth in claim 1 further including a masking means which is inserted in the space between said projection means and the primary projection system to prevent light associated with the projection of said secondary images from inteferring with the projection of the primary images.

3. Apparatus as set forth in claim 2, wherein said masking means includes a structure which can be adjustably positioned relative to both the primary projection system and said projection means in order to accommodate variations in the size of the primary images projected onto the photosensitive medium by the primary projection system.

4. Apparatus as set forth in claim 1, wherein the primary projection system in the photoprinter includes a mechanism which is actuated each time the primary projection system operates to project a primary image onto the photosensitive medium and said circuit means in said control means includes an actuating means which is triggered by the mechanism in the primary projection system to enable said circuit means to determine when each primary image is projected onto the photosensitive medium by the primary projection system.

5. Apparatus as set forth in claim 4, wherein the mechanism which is actuated each time the primary projection system operates to project a primary image onto the photosensitive medium comprises a pneumatically-driven marker for marking the location of each primary image on the photosensitive medium and said actuating means in said circuit means includes a microswitch for detecting pressurization of the pneumatically-driven marker.

6. Apparatus as set forth in claim 1, wherein said projection means includes a carrier means for supporting negatives containing said secondary images, a light generating means for illuminating the negatives supported by said carrier means in order to project said secondary images therefrom, lens means for directing said secondary images so projected onto the photosensitive medium in the photoprinter and shutter means for periodically permitting said secondary images projected from the negatives to pass to said lens means.

7. Apparatus as set forth in claim 6, wherein said lens means includes an adjustable lens element which serves to focus said secondary images on the photosensitive medium in the photoprinter and a mirror means for reflecting said secondary images so focused to a desired position on the photosensitive medium.

8. Apparatus as set forth in claim 6, wherein said light generating means includes a reflector means for directing illumination from said light generating means through the negatives supported by said carrier means in order to project said secondary images from the negatives.

9. Apparatus as set forth in claim 6, wherein said light generating means includes a diffusing means for spreading illumination from said light generating means uniformly over the surfaces of the negatives supported by said carrier means.

10. Apparatus as set forth in claim 6, wherein said shutter means and said projection means operate in response to said control signal generated by said circuit means in said control means and said circuit means includes a circuit element which is used to adjust the duration of said control signal in order to adjust the interval of time during which said shutter means operates to pass said secondary images from the negatives to said lens means.

11. Apparatus as set forth in claim 10, wherein said circuit means includes a multivibrator having a feedback circuit containing a variable resistor.

12. Apparatus as set forth in claim 11, wherein said circuit means further includes an operational amplifier circuit which receives an input from said microswitch means and which supplies an output to said multivibrator.

* * * * *